Dec. 20, 1966     W. G. LIVEZEY     3,292,458
TRANSMISSION
Original Filed Nov. 28, 1962
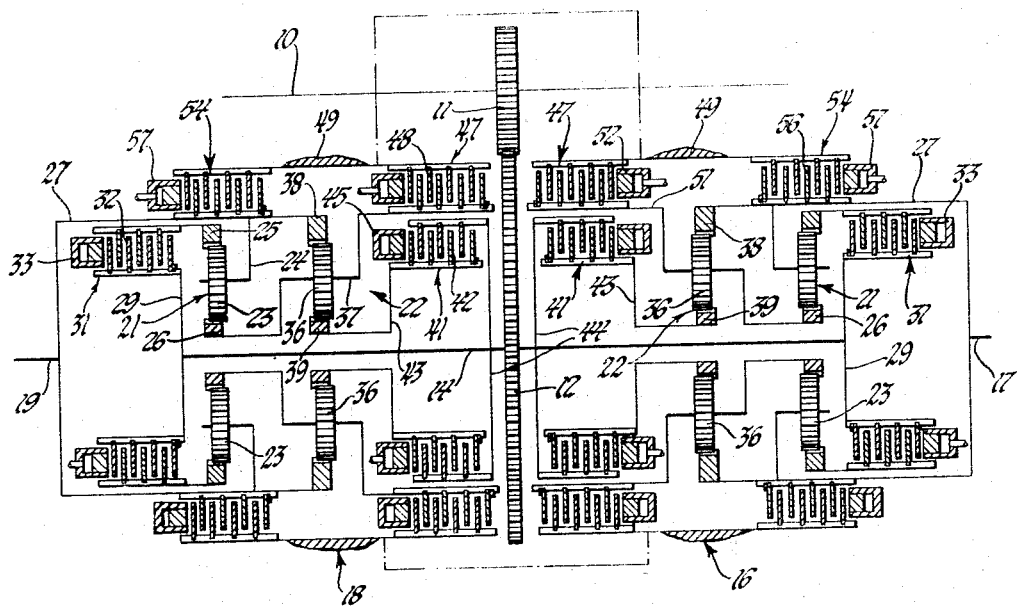
INVENTOR.
William G. Livezey
BY
A. M. Heiter
ATTORNEY United States Patent Office 3,292,458
Patented Dec. 20, 1966

3,292,458
TRANSMISSION
William G. Livezey, Indianapolis, Ind., assignor to General Motors Corporation, Detroit, Mich., a corporation of Delaware
Original application Nov. 28, 1962, Ser. No. 240,599. Divided and this application Aug. 25, 1965, Ser. No. 482,358
2 Claims. (Cl. 74—763)

This invention relates to transmissions and particularly to cross drive transmissions providing a plurality of straight drives and a plurality of steering drives. This application is a division of applicant's application Serial No. 240,559, now Patent No. 3,253,688, filed November 28, 1962.

These cross drive transmissions provide both clutch brake steering for sharp turns and geared steering for gradual turns and two speeds forward and at a reverse drive. The cross drive units have forward and reverse gearing to provide forward and reverse drive and low and high ratios to provide low and high ratio drive. In one form of the invention the input driven cross shaft drives each output shaft through a similar gear unit. In each gear unit the cross shaft drives, through a clutch, the ring gear of the forward drive planetary gear set. The carrier of this planetary gear set is connected to the transmission output. The sun gear is connected to the carrier of the reverse gear set and a brake. The sun gear of the reverse planetary gear set may be connected to the input driven cross shaft to drive the ring gear, which is connected to output, for reverse drive.

Geared steer may be provided by engaging one ratio in one unit and the other ratio in the other unit. Clutch brake steer may be provided by disconnecting the drive in one unit and engaging the brake for that unit. Pivot steer or the equivalent may be provided by engaging reverse in one unit and forward in the other unit. For straight drive low and high ratio forward drive and one reverse ratio is provided.

In another form of the invention, the input is connected by selectively engageable forward and reverse drive trains to drive the cross shaft which is connected by a forward gear set to each of the output shafts. In each gear unit the cross shaft drives the ring gear of the gear set and the carrier is connected to the output. The sun gear is either retarded or clutched to the output to provide respectively a low ratio and a higher ratio or direct drive. In this arrangement, low in one unit may be engaged with high of the other unit to provide geared steer. Also, the drive in one gear unit may be disconnected and the vehicle brake applied for clutch brake steer. Forward or reverse drive may be selectively provided by engaging the forward or reverse clutches and in conjunction with the low and high ratio engaging devices in the forward drive unit, a low and a high ratio may be provided in either forward and reverse.

The forward and reverse clutches are actuated by a single piston dividing a cylinder into two apply chambers. Belleville return springs are employed in each chamber and arranged so that only one spring acts at a time to provide positive centering. The springs are pinned to the piston and cylinder to cause these parts to rotate together. A gear is cut on the external perimeter of the piston to provide a supply pump drive.

An object of the invention is to provide a simple cross drive transmission arrangement for selective operation in either of two forward speeds or a reverse speed and for steering drives providing geared steering and clutch brake steering.

Another object of the invention is to provide a cross drive transmission having a cross shaft driving a pair of gear units connected to the output shaft with each gear unit providing low and high speed forward drive and reverse drive to provide in straight drive two speeds forward and one speed reverse and geared, clutch brake and pivot steering drives.

Another object of the invention is to provide in a cross drive transmission an input driving through selectively engageable forward and reverse gear trains to drive a cross shaft and a pair of low and high ratio gear units connecting the cross shaft to each of the output shafts to provide two speeds forward and two speeds reverse for straight drive and geared and clutch brake steering drives.

Another object of the invention is to provide in a transmission having a pair of clutches a single piston for actuating both clutches located in a cylinder and having retraction springs operative selectively to provide positive centering.

These and other objects of the invention will be more apparent from the following description and drawing of the preferred embodiment of the invention.

The drawing schematically shows a cross drive transmission.

The invention is illustrated in a cross drive transmission in the drawing having an input or transfer shaft 10 rotatably mounted in the fixed housing and driving an input gear 11 meshing with the spur gear 12 fixed on the cross shaft 14. The cross shaft 14 is connected by a right gear unit 16 to drive the right output shaft 17 and also drives through an identical left gear unit 18 the left output shaft 19.

Since the right and left gear units are similar, the following description applies to each gear unit. Each gear unit has a forward drive planetary gear set 21 and a reverse drive planetary gear set 22. The forward drive planetary gear set 21 has planetary pinions 23 mounted on a carrier 24 and meshing with the ring gear 25 and a sun gear 26. The carrier 24 is drivingly connected to a rotary output housing 27 which is connected to drive the output shaft 17 or 19. The cross shaft 14 is connected by an input hub 29 and a forward clutch 31 to the ring gear 25. The clutch 31 consists of a plurality of plates 32 alternately splined to the hub 29 and the drum portion of ring gear 25 and a fluid motor 33 having a conventional piston and cylinder rotating with the clutch assembly 31.

The reverse gear set 22 has a plurality of planetary pinions 36 mounted on a carrier 37 connected to the sun gear 26 of the forward drive gear. The pinions mesh with the ring gear 38 fixed to the output housing 27 and a sun gear 39. The sun gear 39 is connected by the reverse clutch 41 to the cross shaft 14. The reverse clutch has a plurality of friction plates 42 alternately connected to the sun gear hub and drum 43 and the cross shaft hub and drum 44 and a fluid motor 45 having a piston and cylinder rotating with the clutch assembly for engaging the clutch. The carrier 37 is connected by a reaction brake 47 to the vehicle frame. The reaction brake includes a plurality of friction plates 48 alternately splined to the housing 49 and a drum 51 connected to the carrier 37, and a fluid motor having a piston and cylinder fixed on the stationary housing operable to engage the brake plates to engage the brake. The vehicle brake 54 consists of a plurality of plates 56 alternately splined to the output housing 27 and the transmission stationary housing 49 which are actuated by a motor 57 consisting of a piston and cylinder.

The cross drive transmission unit is operated to provide straight forward drive in either low, high or reverse drives and a positive neutral. For forward drive the input clutch 31 is engaged to provide an input drive to the ring gear 25 of the forward drive gear set 21, and the reaction brake 47 is engaged to hold the sun gear 26 to provide low drive. The higher ratio or direct drive is provided by engaging the input clutch 31 to provide an input via ring gear 25 to the forward reaction gear set 21 and by engaging the reverse clutch 41 to provide an input to the sun gear 39 of the reverse planetary gear set 22 to lock up the gear unit for direct drive. For reverse drive the forward clutch 31 is disengaged and the reverse clutch 41 is engaged to provide an input drive to the sun gear 39. When the reaction brake 47 is engaged to hold the carrier 37, there is a reverse drive to the ring gear 38 and output housing 27 to drive either output shaft. In neutral, the reaction brake may remain engaged and still provide a positive neutral. These drives are summarized in the following table.

|         | Brake 47 | Clutch 41 | Clutch 31 |
|---------|----------|-----------|-----------|
| Low     | X        |           | X         |
| High    |          | X         | X         |
| Reverse | X        | X         |           |
| Neutral | X        |           |           |

The steering drives are provided by changing the drives in one of the units with respect to the drive in the other of the units. Thus, for example, right geared steer may be provided by engaging high ratio in the left unit and low ratio in the right unit. Clutch brake steer to the right may be obtained by engaging either low or high ratio in the left unit and providing neutral in the right unit and engaging the right brake 11. A substantially pivot steer may be obtained, for example, for steering to the right, by engaging low forward drive in the left unit and reverse drive in the right unit. This will provide an effective pivot steer even though the low ratio and the reverse ratio is not exactly the same.

The clutch and brake units each have a fluid motor consisting of a piston and a cylinder and retraction springs. The cylinders of the brakes are fixed on the transmission housing and those of the clutches rotate with one of the connected members. When fluid is supplied to a motor the plates are engaged to engage the brake or clutch. These fluid actuated friction torque establishing devices are employed to lock up a gear unit, to hold a gear unit reaction member and to brake the output shaft.

The above described preferred embodiment is illustrated in the invention and is subject to modification within the terms of the appended claims.

I claim:

1. In a transmission, an input driven cross shaft, a pair of output shafts, a gear unit connecting said cross shaft to each of said output shafts, each gear unit including a forward drive and a reverse drive planetary gear set, each of said gear sets including a carrier having planetary pinions meshing with a sun and a ring gear, said forward drive planetary carrier and said reverse drive ring gear connected to an output shaft, a first clutch connecting said cross shaft to said forward drive ring gear, a second clutch connecting said cross shaft to said reverse drive sun gear, said reverse drive carrier connected to said forward drive sun gear, single brake means for retarding both said reverse drive carrier and said forward drive gun gear, and vehicle brake means for retarding said output shaft.

2. In a transmission, an input shaft, an output shaft, a gear unit operatively connecting said shafts including a forward drive and a reverse drive planetary gear set, each of said gear sets including a carrier having a planetary pinion meshing with a sun and ring gear, said forward drive planetary carrier and said reverse drive ring gear connected to said output shaft, a first clutch for connecting said input shaft to said forward drive ring gear, a second clutch for connecting said input shaft to said reverse drive sun gear, said reverse drive carrier connected to said forward drive sun gear and a single brake for retarding both said reverse drive carrier and said forward drive sun gear.

References Cited by the Examiner

UNITED STATES PATENTS 2,892,365  6/1959  Winther    74—763 X
3,039,327  6/1962  Breting    74—720.5
3,053,117  9/1962  Hensel    74—763

DAVID J. WILLIAMOWSKY, *Primary Examiner.*

J. R. BENEFIEL, *Assistant Examiner.*